United States Patent [19]

Jerome

[11] 4,296,491
[45] Oct. 20, 1981

[54] INFORMATION CARRIER HAVING INTER-TRACK IDENTIFICATION CODE INFORMATION

[75] Inventor: Jonathan A. Jerome, Palo Alto, Calif.

[73] Assignee: Atlantic Richfield Company, Los Angeles, Calif.

[21] Appl. No.: 61,794

[22] Filed: Jul. 30, 1979

[51] Int. Cl.³ .................................................. G11B 7/00
[52] U.S. Cl. .................................... 369/59; 358/128.5; 360/72.2; 360/135; 369/30; 369/275
[58] Field of Search .................. 179/100.1 G, 100.3 V; 358/128.5, 128.6, 127; 360/78, 77, 72.1, 72.2, 135; 365/215, 234

[56] References Cited

U.S. PATENT DOCUMENTS

| | | |
|---|---|---|
| 3,789,378 | 1/1974 | Bonzano et al. .................. 360/78 X |
| 3,919,697 | 11/1975 | Walker .............................. 360/78 X |
| 3,931,457 | 1/1976 | Mes .............................. 179/100.3 V |
| 4,094,010 | 6/1978 | Pepperl et al. .................... 360/77 X |
| 4,094,013 | 6/1978 | Hill et al. .......................... 360/77 X |
| 4,106,058 | 8/1978 | Romeas et al. ............. 179/100.1 G |
| 4,138,741 | 2/1979 | Hedlund et al. ................. 358/128.5 |
| 4,190,859 | 2/1980 | Kinjo ................................. 358/128.5 |
| 4,238,843 | 12/1980 | Carasso et al. ...................... 365/234 |

*Primary Examiner*—John H. Wolff
*Assistant Examiner*—Donald McElheny, Jr.
*Attorney, Agent, or Firm*—Nilsson, Robbins, Dalgarn, Berliner, Carson & Wurst

[57] ABSTRACT

An information carrier, and a method of recording thereon, wherein information containing signals are recorded in discrete tracks along with a unique address signal for each track. An identification code signal is also recorded at preselected locations between adjacent tracks.

8 Claims, 5 Drawing Figures

INFORMATION CARRIER HAVING INTER-TRACK IDENTIFICATION CODE INFORMATION

BACKGROUND OF THE INVENTION

The invention relates generally to an information-containing carrier in which the information is recorded in a plurality of tracks, each of which includes a unique information or address code identifying each specific track of recorded information.

Information carriers of this type known to the prior art have the information recorded by means of magnetic, optical, thermal or electrical characteristics of the carrier. The present invention is applicable to all carries having such characteristics and is not restricted to the particular configuration of the carrier; that is, the carrier may be in the form of a disc, a card or plate, a drum, cylinder, tape or other geometry.

In known information carriers access to a particular track containing information desired is accomplished in several ways. One of these causes the reading apparatus to automatically move in discrete steps from one information-containing track to the next adjacent track and to detect the unique identifying address for each particular track. Only when the desired track is reached will the reading apparatus stop and convey the information contained thereon.

In a different system the reading apparatus is caused to move rapidly in jumps of a predetermined number of tracks and after each jump to read the address and compare it to the desired track. When the difference between the desired track address and the actual track address being read is different than the predetermined number, then the apparatus moves from track to track sequentially until the desired track is reached.

In yet a different system voltage comparison or other physical measurement means is utilized for determining the position of the desired information as compared to the position of the apparatus reading the information from the carrier.

In still a further system the reading apparatus is caused to quickly move from a first position to a second position through a distance equal to a number of tracks. The number of tracks through which the movement occurs is determined by taking the difference between the address position of the reading device and the address of the track desired. As movement occurs, the tracks passed are counted until the desired number of tracks have passed, at which point in time the reading device is caused to stop and then enter a fine search phase similar to that first above described prior to locking onto the desired track.

The fastest access time to a desired track which is available by any of the known systems is on the order of a few seconds. The best prior art known to applicant is shown in U.S. Pat. Nos. 3,931,457 and 4,106,058.

SUMMARY OF THE INVENTION

According to the present invention there is provided a substrate containing a recording medium. A plurality of discrete signal information-containing tracks is recorded upon said medium with each of the tracks containing a unique address code recorded at a preselected position therein. An indexing code signal is recorded between adjacent tracks.

In accordance with a method of recording in consonance with the present invention, a signal is generated which is representative of information and an address code. That signal is then recorded upon a medium capable of receiving the same so as to define a plurality of discrete tracks on the medium. An index code only is recorded between adjacent tracks.

BRIEF DESCRIPTION OF THE DRAWINGS

FIG. 4 is a schematic diagram of apparatus which may be used to record upon the information carrier; and FIG. 5 is a schematic representation of one form of apparatus which may be utilized to read information recorded upon the information carrier in accordance with the present invention.

DETAILED DESCRIPTION OF THE INVENTION

The present invention provides the user of recorded information faster data access time, on a random basis, to any particular desired information-containing track than any system currently known. To accomplish this random and quick access to a particular track, a unique, identifying code is recorded with each track of signal information, and in addition thereto an indexing code is recorded between adjacent tracks. The index code provides position information to determine at any time where, upon the information carrier, the reading apparatus (read head) is positioned, even though it is not reading a particular track of information. With such information availability the read head can be caused to continuously move to a desired position without counting, moving arbitrarily predetermined distances, or the like. Through constant comparison of the position of the read head relative to the information-containing tracks on the carrier, the relative position between the read head and the carrier is constantly known and the disparity between its known position and desired position is constantly known. Therefore, when the desired information containing track is positioned at the read head, movement is stopped and the information contained on the desired track can be acquired.

Figure 1:
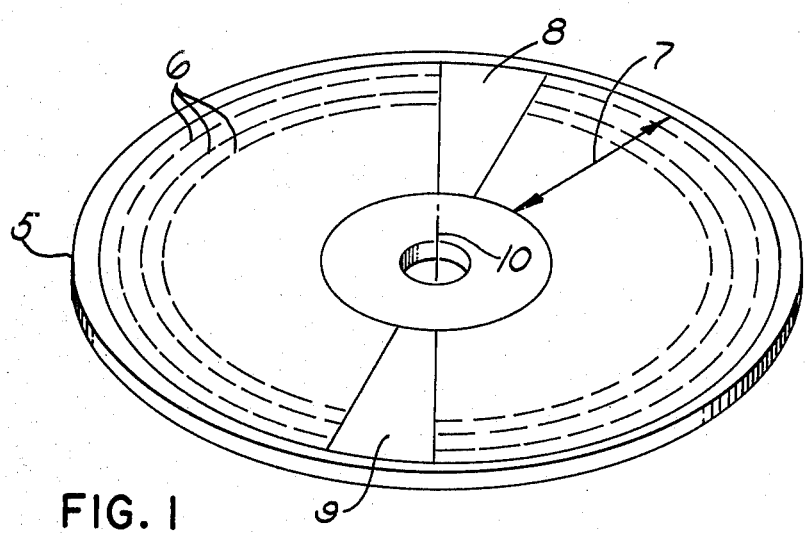
FIG. 1 is a schematic, diagramatic, perspective view of one form of information carrier which may be used in accordance with the present invention.

One form of information carrier which may be utilized in accordance with the present invention is illustrated in FIG. 1 to which reference is hereby made. As is therein shown, a disc 5 constructed of, for example, polyester has recorded thereon a plurality of discrete tracks 6 of information for example, video signals. Each of the tracks 6 has a width of a few micrometers and adjacent tracks are spaced apart a few micrometers, for example, three to seven and may be situtated across the surface of the disc, for example, over the area as indicated by the arrow 7. Each of the video tracks 6 contains a complete television image signal along with sectors 8 and 9 in which are recorded specific control signals along with the desired address code as will be more fully described below.

The disc as illustrated in FIG. 1 is adapted for rotation about its central axis 10. Preferably, the video signals contained upon each video track 6 are optically recorded upon the transparent disc 5 and may be detected therefrom by transmission or reflection of light properly focused as is well known in the art.

As has been stated above, the present invention is applicable to any type of medium such as magnetic, optical, thermal or electric and to any particular physical configuration of the carrier such as plate, cylinder, drum, tape or disc. However, for purposes of clarity of illustration and ease of description, applicant will confine the description of the invention to the utilization of a transparent disc having information optically recorded thereon.

Figure 2:
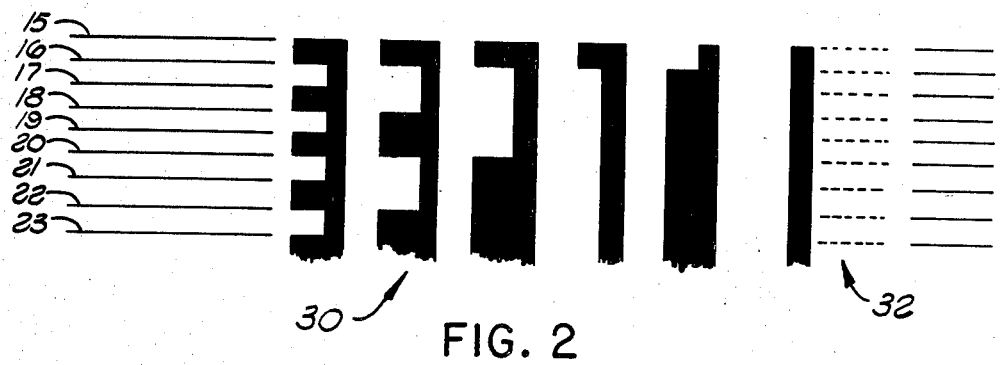
FIGS. 2 and 3 are schematic representations of identification code information as recorded upon the carrier illustrated in FIG. 1.

Referring now more particularly to FIG. 2, there is illustrated in schematic form a preferred form which the identification code signals would take in accordance with the principles of the present invention. As is therein shown, the video signal information-containing tracks are illustrated at 15 through 23. As is well known in the art, each of these tracks would typically be a few micrometers in width and would also be separated by a few micrometers. It will therefore be readily understood that the scale shown in FIG. 2 is not representative but is chosen merely for purposes of clarity of illustration.

Disposed typically within the sectors 8-9 as shown in FIG. 1 would be the identification code signal information shown in FIG. 2, generally at 30. Although this information can take any particular format desired, the format illustrated is that of binary designations with the long dark portion representing a binary 1 and the short dark portion a binary 0. In accordance with prior art, the binary identification code signal would appear in line with each of the tracks 15 through 23 as they appear on the disc 5 and would have the identical spacing therebetween as occurs between adjacent tracks of video signal information such, for example, as between the tracks 15 and 16.

As can be seen in FIG. 2, the identification code signal information is recorded upon the disc 5 not only in-line with each of the tracks of video signal information but also between adjacent tracks. As will be seen, for example, the binary signal appearing for track 15 may be read as 111100 (the binary equivalent of 15). On the other hand, the binary signal appearing for the track 16 is 000010 (the binary equivalent of 16). In the space between the video signal tracks 15 and 16 the binary identification code uniquely associated with track 15 is re-produced. Similarly, the binary identification code associated with the track 16 is produced in the space between the adjacent tracks 16 and 17.

Those skilled in the art will notice that the identification code changes at each of the tracks 15 through 23 but remains the same between adjacent tracks. If one were to read the identification code signal by scanning the same from the top toward the bottom, as viewed in FIG. 2, the identification code appearing between adjacent tracks would be that code identifying the uppermost of the two adjacent tracks. For example, the binary code between tracks 15 and 16 is the identification code (indexing code) for track 15. On the other hand, the identification code between tracks 19 and 20 is the identification or indexing code for track 19.

It will also be noticed by those skilled in the art that if one reads the index code, as illustrated in FIG. 2, from the bottom to the top, then the index code between adjacent tracks would be the same as the address code for the next track to be read. For example, when reading from the bottom to the top as shown in FIG. 2, the index code between tracks 20 and 19 would be the index code for track 19, while the index code between tracks 16 and 15 would be the index code for track 15. Therefore, for precise location of the track containing desired signal information, the relative direction of reading of the identification code must first be known.

It will also be recognized by those skilled in the art that although only six binary digits have been shown in the identification code signal as schematically illustrated in FIG. 2, such is done by way of example only, and any particular number desired or required for the particular application may be utilized. Such capability is represented by the dashed lines 32 following the binary coded signals 30 and just prior to the continuation of the signal tracks 15 through 23.

Figure 3:
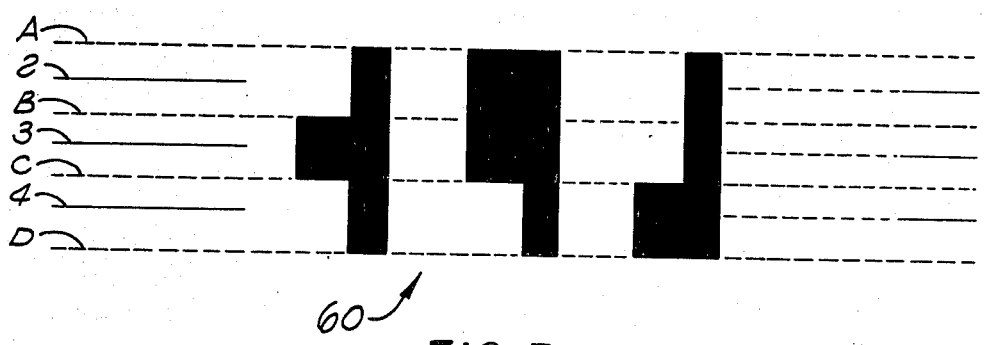

Under certain circumstances it may be desirable for the identification code signal to take a different format from that shown in FIG. 2. One such alternative format is illustrated in FIG. 3, to which reference is hereby made. As is shown in FIG. 3 there are video tracks 2, 3 and 4 followed by the binary code signal 60 (the binary equivalent of 2, 3, and 4, respectively) shown in this instance as containing three binary digits. As will be noted by reference to the dashed lines A, B, and C, the indexing information positioned between the tracks changes approximately at the mid-point between adjacent tracks. Thus, as one reads the address code for a particular track and then continues movement towards the next adjacent track, mid-way between the tracks the index code changes from the address code of the previously read track to the address code of the track to be approached, irrespective of the direction in which the reading is taking place. By utilization of such an approach it is believed that the recording of the indexing code between tracks will be made somwhat easier since less care will have to be exercised when recording the indexing code so as not to interefere with the proper address code for adjacent tracks. That is, as will be seen by again referring to FIG. 2, when progressing from track 15 to 16, it is noted that the binary digits in the first five places change. Where the digit changes from a 1 to a 0, as it does in the first four places, if care is not taken while recording the binary 1 between the tracks 15 and 16, the address code for the track 16, wherein the first four digits are 0, may be improper. Where the change from the 1 to the 0 takes place midway between the tracks as is shown in the first through the third binary digits of FIG. 3, less care need be exercised.

Although with respect to FIGS. 2 and 3 the indexing code in each instance has been chosen the same as the address code for an adjacent track, it should be recognized by those skilled in the art that such is not required. An entirely different and completely unique indexing code could be generated for the spaces between adjacent tracks and recorded within the space between adjacent tracks, totally separated and distinct from the address code for each of the tracks concerned. Obviously, appropriate logic would be required to recognize the differences between the address codes and the indexing codes and to perform the appropriate operations with respect thereto as may be required for any particular application. It will also be recognized by those skilled in the art that even though in FIGS. 2 and 3 the indexing code between tracks has been shown as a solid recording, and such is the presently preferred embodiment, there may be separations therein between the address code and the indexing code and there may be different densities and intensities of recording as compared to the address codes without departing from the spirit or the scope of this invention.

Means for performing the recording of the video signal information as well as the address and indexing codes are well known to those skilled in the art. However, for purposes of completeness of description, reference is now made to FIG. 4 where such an apparatus is shown in schematic form. As is therein shown, an appropriate video signal is applied by way of the cable 62 to an Identification Code Generator/Control Device 64. The Identification Code Generator/Control Device then provides, on the cables 66 and 68, both video information and the identification code. Timing signals are also generated by the generator and are applied by way of cable 70 to a mixer 72. The combined signal consisting of the video and the identification code information along with the timing signal are applied to an amplifier 74 by way of the cable 76. The output of the amplifier 74 is applied by way of the cable 78 to a modulator drive 80 which is coupled by cable 82 to a modulator 84. The modulator 84 appropriately modulates the light from a laser generator 86 in accordance with the signal and identification code information. The thus modulated light as illustrated at 88 is applied to a lens 90 which focuses, as shown at 92, the appropriate light signal upon the recording medium residing on the substrate 94 which is being rotated at approximately 1800 r.p.m. about the axis 96 thereof as is illustrated by the arrow 98. A disc drive and positioning mechanism 100 also receives the timing signals by way of the lead 70' and positions, according to a particular program, the disc 94 to receive the signals from the modulator 84 at the appropriate locations thereupon as is determined by the timing signals. The positioning is illustrated by the arrow 102.

Figures 4, 5:
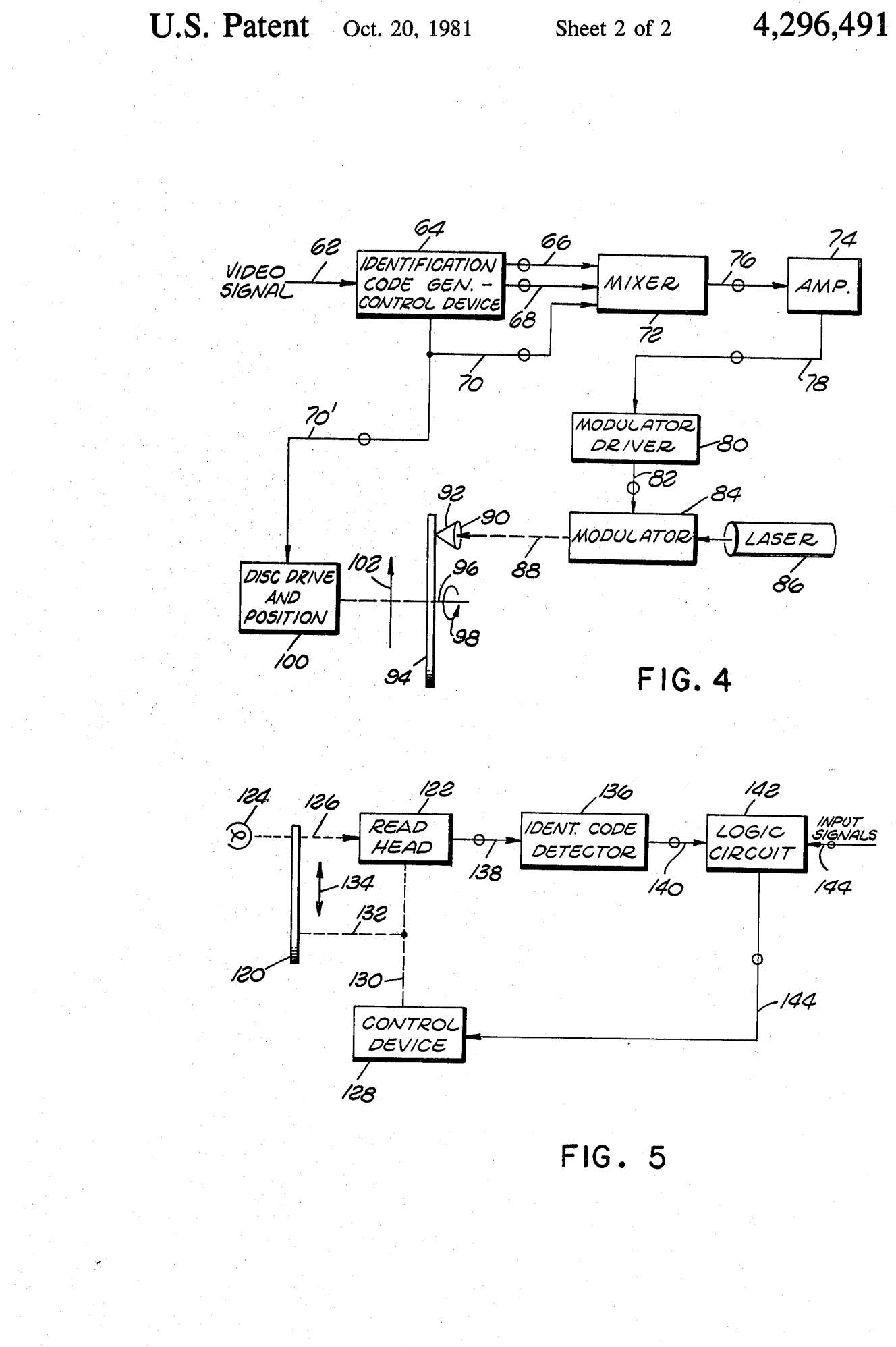

In operating the mechanism, as shown in FIG. 4, for recording the desired signal information upon the disc 94, the following steps are taken. The disc is first positioned at the correct radial location to commence the recording. Thereafter the disc is rotated at the desired speed, for example, 1800 r.p.m. The video signal containing the address code positioned therein at the appropriate point is then recorded at the first radial location. The disc is then moved by the drive mechanism 100 to a location intermediate to the first location and the next appropriate location at which video signal information will be recorded. At this intermediate radial location the indexing code only is recorded. As above noted, the indexing code may be the same as the address code for the previously recorded video information track, or alternatively, may be composed of different signal information. The disc is then again positioned radially, for example, to the next radial location where video signal information will be recorded at which time the appropriate video signal information with its appropriate address code is then recorded. The entire process is then repeated.

It will be immediately apparent to those skilled in the art that the recording of the indexing code between adjacent tracks may be accomplished with a plurality of steps depending upon the distance between the tracks, the intensity and the fidelity of the indexing information desired and whether or not the recorded indexing information changes states within the space between the tracks.

It will also be recognized by those skilled in the art that the apparatus for reading the thus recorded indexing code is well known to those skilled in the art and merely consists of appropriate apparatus for illuminating the images on the information carrier 5 and detecting the differences therein by an appropriate reading apparatus. Schematically, such a structure is generally shown in FIG. 5 to which reference is hereby made. As is therein shown the disc 120 is positioned so as to be rotated at the appropriate speed, for example, 1800 r.p.m. A read head 122 is positioned adjacent thereto. Light means 124 is positioned to convey light, as shown by the arrow 126, through the carrier 120 and onto the read head 122. A control device 128 is coupled, as illustrated by the dashed lines 130, 132, either to the read head or the disc rotating mechanism so that the position between the read head 122 and the disc 120 may be relatively varied as shown by the arrow 134. The identification code detector 136 is coupled by the cable 138 to the read head 122 and receives and detects the information relative to the address and indexing codes. The address and indexing codes are then transmitted by the cable 140 to the logic circuit 142. As is well known, the logic circuit will receive the information as well as additional information that may be programmed and placed therein such, for example, as input signals, searching information and the like which may be applied, for example, over the cable 144. After appropriate operations upon the input information the logic circuit 142 provides control signals which are coupled by the cable 144 to the control device 128 to position it at the desired location to retrieve the information which is desired from the appropriate track pre-recorded upon the disc 120.

For example, in a typical operation, the operator will know that the information which he wishes to acquire is located, for example, upon a particular track situated at a predetermined location upon the disc 120. The address for that particular track will be inserted as an input signal by way of the cable 144 into the logic circuit 142. The disc 120 will be spinning and the read head will detect the position of the information being illuminated by the light 126; that is, the particular address for the position of the read head on the disc will be detected and applied to the logic circuit 142 where it is compared with the address of the desired track. The logic circuit will then determine which direction the read head must be moved relative to the tracks on the disc 120 and will commence the movement thereof through the control device 128. The movement will occur quickly and smoothly with the read head constantly detecting the indexing information stored upon the disc. When the indexing information corresponds to the desired address signal, movement of the read head relative to the disc will cease and the read head will "lock on" to the particular track which has then been acquired through this appropriate positioning. In the event there is a slight discrepancy, that is, there may have been an undershoot or over-shoot by the control device, the read head will be fine positioned relative the surface of the disc to acquire the precise track as previously addressed.

It is believed that the present invention provides information carriers which will permit faster access to the stored data than any prior art carriers. The information carriers of the present invention will also permit random access to the stored data as well as smoother operation of reading apparatus. For example, reading apparatus will not be required to move in jumps or other sporadic motions.

What is claimed is:

1. Information-containing apparatus comprising:
(A) a substrate;

(B) a recording medium deposited on said substrate;
(C) a plurality of discrete signal data-containing tracks recorded in said medium;
(D) a discrete address code representative of each of said data-containing tracks recorded at a preselected position in said medium and in line with said data-containing track with which the discrete address code is associated, said address codes all appearing within a predetermined region in said medium; and
(E) an index code recorded in said medium and disposed in a direction laterally of said data-containing tracks and between adjacent address codes, said index code being representative of the location on said medium at which it is recorded.

2. Information-containing apparatus as defined in claim 1 wherein said substrate is a disc, said address codes are recorded radially aligned, and said index code is recorded between said address codes.

3. Information-containing apparatus as defined in claim 1 wherein said data, said address code and said index code are optically recorded.

4. Information-containing apparatus as defined in claim 1 wherein said index code totally fills the lateral area between adjacent address codes.

5. Information-containing apparatus as defined in claim 1 wherein said index code between two adjacent address codes is identical to said address code in one of said tracks when said data is read from said apparatus by moving a reading means in a first direction laterally of said tracks.

6. Information-containing apparatus as defined in claim 1 wherein said index code between two adjacent tracks changes.

7. The method of recording indexing information on a recording medium comprising:
(A) generating a signal to be recorded which is representative of data and an address code;
(B) recording said signal to be recorded on said medium to define a plurality of discrete data tracks thereon;
(C) recording said address code in line with said data track;
(D) generating an index code;
(E) recording said index code in the laterally disposed space between said address codes.

8. The method of claim 7 wherein said recording between tracks is done in a plurality of steps.

* * * * *